July 6, 1965 W. J. EHNER 3,193,312
MEANS FOR ATTACHING A KNOB TO A SHAFT
Filed Aug. 23, 1962
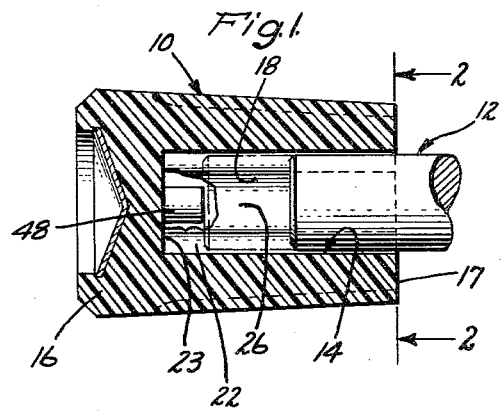
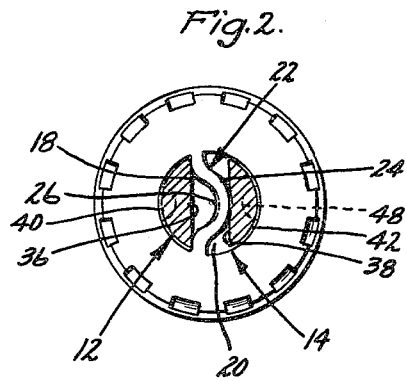
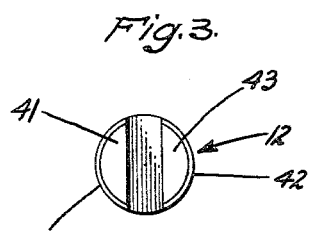
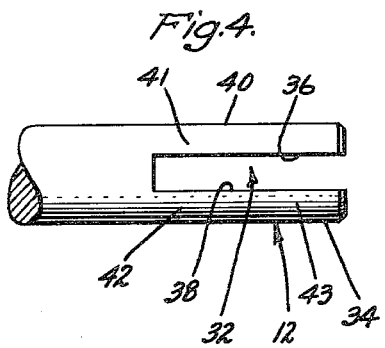
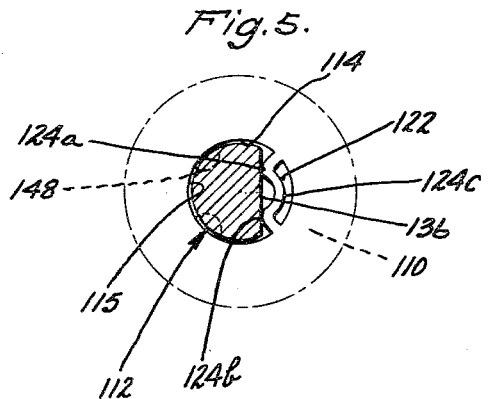
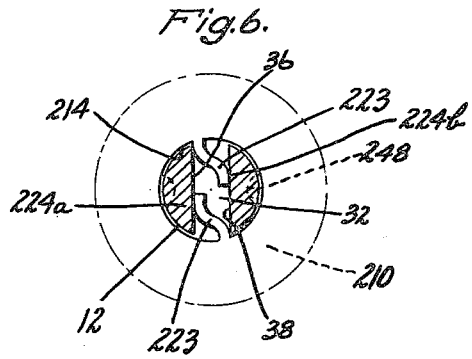
Inventor:
William J. Ehner,
by Thomas A. Briody
Attorney.

United States Patent Office 3,193,312
Patented July 6, 1965

3,193,312
MEANS FOR ATTACHING A KNOB TO A SHAFT
William J. Ehner, Morrison, Ill., assignor to General Electric Company, a corporation of New York
Filed Aug. 23, 1962, Ser. No. 219,030
3 Claims. (Cl. 287—53)

This invention relates to attaching means, and more particularly to means for attaching a knob to the end of a shaft for establishing a driving connection therebetween.

To securely couple removable knobs of the prior art to apparatus control shafts and establish a driving connection therebetween, a separate resilient holding member such as a spring has commonly been used in conjunction with the knob and shaft. Such a spring is usually seated in a cavity of the knob and it resiliently cooperates with a slotted shaft to securely but removably couple the knob thereto. It has been deemed desirable to provide a more simplified resilient coupling for a knob and shaft which obviates the necessity of using a separate spring, and operates in an effective manner.

The principal object of the present invention is to provide a new and improved means for attaching a knob or like element to a shaft to establish a driving connection therebetween.

Another object of the present invention is to provide an improved coupling means for a knob and a shaft, wherein the knob includes an integral resilient means for cooperation with the shaft.

A further object of my invention is to provide an improved means for removably attaching a knob to a shaft, which means includes a minimum number of parts and is very low in cost.

In carrying out the present invention, in one form thereof it is applied to a knob which is arranged for attachment to the bifurcated outer end of a manually adjustable shaft. The knob is of molded construction and it includes a recess having a compressible tongue formed integrally therein for cooperation with the outer end of the shaft. With such an arrangement the outer end of the shaft is inserted into the recess of the knob and the tongue is disposed in compression between the two branches of the bifurcated end of the shaft to resiliently seat the knob upon the shaft. With this coupling arrangement only two parts, a shaft and a knob, are required to effect a simplified and efficient driving connection therebetween. Such an approach is readily manufacturable and also very economical in cost.

Further aspects of my invention will become apparent hereinafter, and the specification concludes with claims particularly pointing out and distinctly claiming the subject matter which I regard as my invention. The invention, however, as to organization and method of operation, together with further objects and advantages thereof, may best be understood by reference to the following description when taken in conjunction with the accompanying drawing in which:

FIG. 1 is a side elevation view partially in section and partially broken away of a knob and shaft embodying one form of my invention;

FIG. 2 is a sectional view taken along the line 2—2 of FIG. 1;

FIG. 3 is an end view showing the bifurcated end of the shaft of FIG. 1;

FIG. 4 is a side elevation view of the bifurcated end of the shaft of FIG. 1;

FIG. 5 is a sectional view showing a knob and shaft embodying a second form of the present invention; and FIG. 6 is a sectional view showing a knob and shaft embodying a third form of the present invention.

Referring now to the drawing for a detailed explanation of the present invention, attention is initially directed to FIG. 1. As shown therein a first form of my invention includes a knob 10 of molded plastic material which may be removably attached to a shaft 12 in a simplified and effective manner. The knob 10 has a grooved and tapered outer periphery (FIGS. 1 and 2) and an axially elongated opening or cavity 14 (FIG. 1) which is closed at one end by a front wall 16. The other end of cavity 14 opens into rear end wall 17.

Turning now to an important aspect of the present invention which provides a means integral to knob 10 for resiliently coupling the shaft 12 thereto, attention is directed to FIG. 2. As shown therein, the cavity 14 is divided into two asymmetrical and longitudinally elongated recesses 18 and 20 by means of an undulated tongue 22 molded as an integral part of the knob 10. Tongue 22 extends in a direction parallel to the axis of cavity 14 between inner end wall 23 and open end wall 17 thereof. In the illustrated embodiment shown in FIGS. 1 and 2, tongue 22 has a generally uniform width or thickness and it includes a convex surface 24 which extends longitudinally and faces toward one side of the knob 10 (e.g., to the right side, viewing FIG. 2). The tongue 22 also includes an elongated concave surface 26 which extends longitudinally and faces toward the other and opposite side of the knob 10 (e.g., to the left side, viewing FIG. 2).

For the illustrated embodiments of my invention, the knob 10 and its tongue 22 are integrally molded from a plastic material such as, for example, polycarbonate or acetal.

As shown in FIGS. 3 and 4, the shaft 12 includes an axially and diametrically extending slot 32 formed upon its end 34. The slot 32 provides a pair of opposed elongated flat surfaces 36 and 38 which are spaced apart and extend in a direction parallel to the axis of the shaft 12. The end 34 of shaft 12 otherwise includes a pair of oppositely facing cylindrical surfaces 40 and 42. As shown in FIG. 3, the slot 32 in shaft 10 thus provides a pair of spaced apart stems 41 and 43 which each have a segment shaped cross section.

In accordance with the present invention, the bifurcated end 34 of the shaft 12 may be removably and securely fitted into engagement with the aperture 14 of the knob 10 so that undulated tongue 22 is sandwiched into compression between the flat opposed surfaces 36 and 38 of the slot 32 of the shaft. More particularly, as shown in FIG. 2, the oppositely facing cylindrical surfaces 40 and 42 of the shaft 12 are fitted into proximate or contiguous relationship with respective cylindrical surfaces of the recesses 18 and 20. The elongated flat surface 36 of the slot 32 engages the concave elongated side 26 of tongue 22 at each of its outer ends (FIG. 2). The elongated and flat other surface 38 of the slot 32 of the shaft 12 is in tangential engagement with the convex elongated side 24 of tongue 22. As illustrated by the dotted lines in FIG. 2, upon the insertion of the bifurcated end 34 of the shaft into the knob recess 14 (indicated by the dotted lines in FIG. 1), the tongue 22 is thus flexed laterally in compression, in a direction generally transverse to the axis of shaft 12 and perpendicular to surfaces 36 and 38 of shaft slot 32. The convex and concave sides 24 and 26 of the tongue 22 are thereupon in resilient frictional engagement, respectively, with the flat elongated sides 38 and 36 of slot 32 to retain the knob 10 in secure removable engagement with the end of shaft 12. In addition, the tongue 22 also presses the surfaces 40 and 42 of the bifurcated end of the shaft against their adjacent cylindrical walls of the recess.

Since the tongue 22 is integral to the knob 10, the tongue 22 is only capable of a minimal and relatively small deflection adjacent its supported or innermost end (i.e., the end near wall 16 of the knob). In view of this, if the outermost ends of shaft stems 41 and 43 were to be seated in contiguous proximity to inner end 23 of the cavity 14, or extended all the way into the cavity, a frictional effect such as binding might occur between the shaft and the knob, making it very difficult to remove the knob from the shaft. To preclude the possibility of binding between the shaft and knob, and to enable the shaft 12 to be readily removed from its seated position in knob 10 by means of a substantially uniform pull-out force, as shown in FIGS. 1 and 2, a pair of opposed shaft stops 48 are molded respectively into the recesses 18 and 20 near the inner end 23 of the cavity 14. With such an arrangement, when the shaft 12 is seated into engagement with the knob 10, the outermost ends of stems 41 and 43 engage stops 48 at such an axial position in the recesses 18 and 20 that substantially uniform lateral deflection of tongue 22 is obtained and a substantially uniform pull-out force is required to remove the knob from coupling engagement with the shaft. With such an arrangement of the tongue 22 and stops 48, the shaft 12 does not need to be seated all the way into the knob recess to establish a secure driving connection therebetween. For example, the outer end of shaft 12 may be spaced axially away from stops 48 within recess 14 and a secure coupling between the shaft 12 and knob 10 may still be achieved by means of the engagement of tongue 22 with the shaft.

FIG. 5 represents a second form of the present invention wherein knob 110 and a shaft 112 have been employed. The knob 110 has an external resemblance to knob 10, but it includes a shaft receiving cavity 114 having one large and continuous elongated cylindrical wall 115 and an elongated undulated tongue 122 which is disposed on one side of the cavity 114. The tongue 122 has, in general, a W-shaped cross sectional configuration and it is integrally connected to the wall of cavity 114, as shown in FIG. 5, forming part of the knob 110. More particularly, the tongue 122 includes two spaced apart and elongated convex surfaces 124a and 124b which extend longitudinally relative to the axis of cavity 114 and face to the left, viewing FIG. 5, and an intermediate convex surface 124c which extends longitudinally and faces to the right, viewing FIG. 5.

The knob 110 is adapted to resiliently cooperate with a single flattened surface 136 formed on one side of shaft 112. Thus, more particularly, when the shaft 112 is seated into engagement with the knob 110, as shown in FIG. 5, the two convex surfaces 124a and 124b of tongue 122 (which face to the left) deflect laterally. As a consequence of their lateral deflection, surfaces 124a and 124b are thereupon disposed in compression with the flattened surface 136 of the shaft 112 and they frictionally engage the shaft to resiliently and removably couple it into engagement with the knob 110.

The knob 110 includes a pair of stops 148 (shown by the dotted lines of FIG. 5) similar to the stops 48 of knob 10. The stops 148 limit the axial penetration of shaft 112 into cavity 114 and prevent the occurrence of binding between the inner end of the shaft 112 and the knob 110. This arrangement enables the shaft 112 to be readily removed from engagement with the knob 110 by means of the exertion of a uniform pull-out force in the same manner as previously set forth for knob 10 and shaft 12.

FIG. 6 shows a third form of the present invention wherein the bifurcated shaft 12 is resiliently and removably coupled to a knob 210. The knob 210 has an external resemblance to knob 10, but includes a generally cylindrical cavity 214 having a pair of longitudinally elongated ribs 223 formed on its inner walls in diametrically opposed relationship. The ribs 223 are also extended in generally parallel relationship and they have a shallow S-shaped cross-section with their curved outer ends 224a and 224b (which are disposed inwardly of the wall of cavity 214), facing in opposite directions for frictionally engaging the aforementioned flat surfaces 36 and 38 of the shaft 12. Thus, as is shown in FIG. 6, when the knob 210 is seated on shaft 12, the curved elongated outer ends 224a and 224b of ribs 223 flex laterally into compressive engagement with surfaces 36 and 38 of the bifurcated end of shaft 12. More specifically, surface 36 of the slot 32 of shaft 12 is thereupon disposed in frictional engagement with the curved outer end surface 224a of lower rib 223 and surface 38 of the shaft 12 is disposed in frictional engagement with the curved outer end surface 224b of the upper rib 223, to resiliently and removably couple the knob 210 to shaft 12.

The knob 210 includes a pair of stops 248 (shown by dotted lines of FIG. 6) similar to the stops 48 of knob 10. The stops 248 limit the axial movement of shaft 12 into cavity 214 and prevent binding between the inner end of shaft 12 and the knob 210. This arrangement enables the shaft 12 to be readily removed from engagement with the knob 210 by means of the exertion of a uniform pull-out force, in the same manner as previously set forth for knob 10 and shaft 12.

It will now therefore be seen that my new and improved knob and shaft coupling arrangement as illustrated herein provides a simplified and effective means for removably establishing a driving connection between these two members. It will be understood further that my knob and shaft attachment means involves a minimum number of parts and is relatively inexpensive to manufacture.

While in accordance with the patent statutes, I have described what at present are considered to be the preferred embodiments of my invention, it will be obvious to those skilled in the art that various changes and modifications may be made therein without departing from my invention, and I, therefore, aim in the following claims to cover all such equivalent variations as fall within the true spirit and scope of this invention.

What I claim as new and desire to secure by Letters Patent of the United States is:

1. A control assembly comprising a bifurcated shaft member, a knob member having a central bore extending into it for receiving said shaft, a cross wall extending transversely across said bore, the transversely extending configuration of said cross wall being a shallow U with laterally extending portions, said cross wall being molded integrally with the side walls and bottom wall of said central bore, said cross wall being resilient and compressible, and said knob being removably secured on said bifurcated shaft with the cross wall partially straightened by compressive engagement between the two sections of said bifurcated shaft to frictionally engage with the shaft and couple said knob member to said shaft member and prevent the rotation of one relative to the other and at least one stop member integrally molded with the bottom wall of said bore, spaced from the cross wall and projecting above said bottom wall, said stop engaging the innermost end of said shaft when it is assembled with said knob to limit the axial movement of the innermost end of said shaft into said bore to prevent the binding of said cross wall with said shaft.

2. A control assembly comprising a shaft having two branches, each of said branches having a flat planar wall, said planar walls being parallel to and facing one another, a knob arranged for removable attachment to one end of said shaft, said knob including a central bore formed therein, an elongated integral cross wall disposed in said central bore, said cross wall being integrally molded with the bottom wall and the side walls of said central bore, said cross wall extending in a direction parallel to the axis of said shaft and transversely across said central bore, the transversely extending configuration of said cross wall being a shallow U with laterally extending ends, said knob being removably secured on said bifurcated shaft with the cross wall laterally compressed and partially straightened by compressive engagement between said two flat planar walls, the elongated convex side of said cross wall being in compressive engagement with one of said planar walls and the two laterally extending ends of the other side of said cross wall being in compressive engagement with said other planar wall, the elongated dimensions of said cross wall remaining substantially constant, and at least one stop member integrally molded with the bottom wall of said central bore and spaced from the cross wall and projecting above said bottom wall, said stop engaging the innermost end of said shaft when it is assembled with said knob to limit the axial movement of the innermost end of said shaft into said central bore to prevent the binding of said cross wall with said shaft.

3. A control assembly comprising a shaft formed with a bifurcated end formed by an axially extending slot transversely across said end to define a pair of separated shaft stems having opposed spaced apart and generally flat walls; and a knob removably attached to said bifurcated end of said shaft; said knob being molded in a single piece of resilient and compressible plastic material including an end wall and a bore open at said end wall; said bore having side walls defining a generally cylindrical surface projecting axially away from said end wall and terminating in a bottom wall within said knob axially spaced from said end wall; a cross wall disposed in said bore integrally molded to said bottom and side walls extending transversely across said bore accommodated in the axially extending slot of said bifurcated shaft for removably attaching said shaft and knob together in driving relation; said cross wall having an axial length approximating that of the bore and a central, transversely curved portion extending for a distance less than the full transverse dimension of the cross wall, formed with a convex surface generally projecting for its axial length; said curved portion terminating adjacent the side walls in a pair of lateral end portions each integrally joined to an associated side wall of the bore, with the convex surface of said cross wall compressively engaging the flat wall of one of said shaft stems to hold the outer periphery of said one stem next to the cylindrical bore surface and with the respective surfaces of said two lateral end portions disposed away from said convex surface being in resilient engagement with the flat wall of the other shaft stem to hold the outer periphery of said other stem next to the associated cylindrical bore surface, whereby said cross wall is sandwiched into compressive engagement between said shaft stems to bias said stems in opposed directions toward diametrically opposite cydrical surfaces of the bore and a firm driving connection is established between the knob and shaft.

References Cited by the Examiner
UNITED STATES PATENTS

| | | |
|---|---|---|
| 1,832,554 | 11/31 | Holstein. |
| 2,153,950 | 4/39 | Whinery. |
| 2,189,845 | 2/40 | Terrill. |
| 2,253,831 | 8/41 | Wantz |
| 2,283,905 | 5/42 | Beal. |
| 2,604,583 | 7/52 | Torre. |
| 2,972,493 | 2/61 | Water. |

FOREIGN PATENTS 174,159   3/35   Switzerland.

CARL W. TOMLIN, *Primary Examiner.*

THOMAS F. CALLAGHAN, *Examiner.*